April 28, 1936.  E. BUGATTI  2,039,210
AXLE FOR VEHICLES
Filed May 28, 1935   2 Sheets-Sheet 1
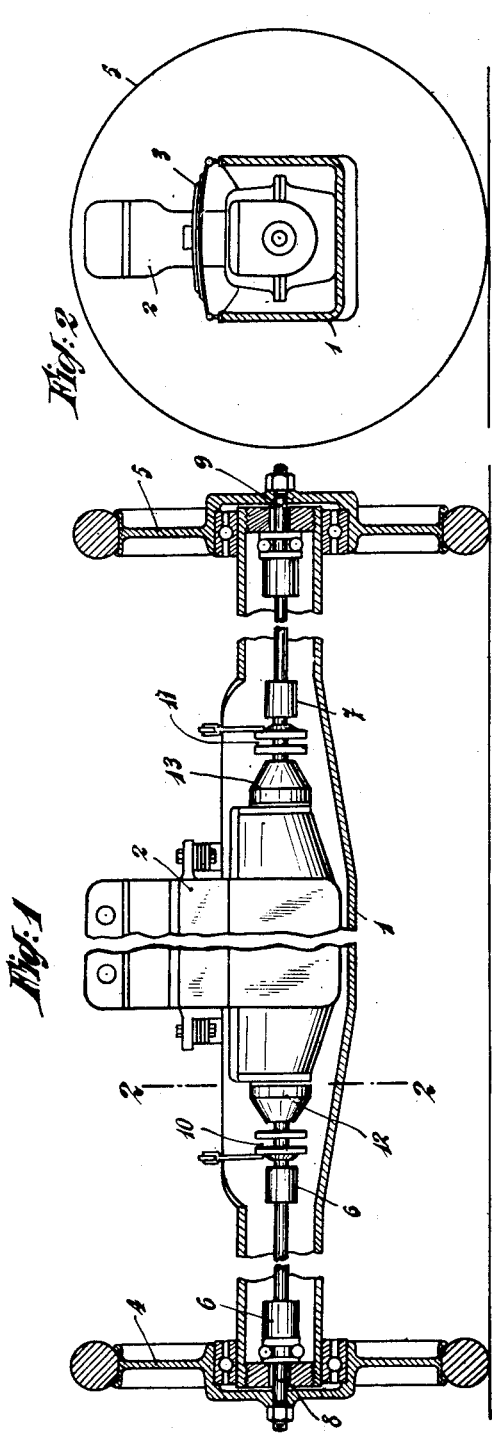
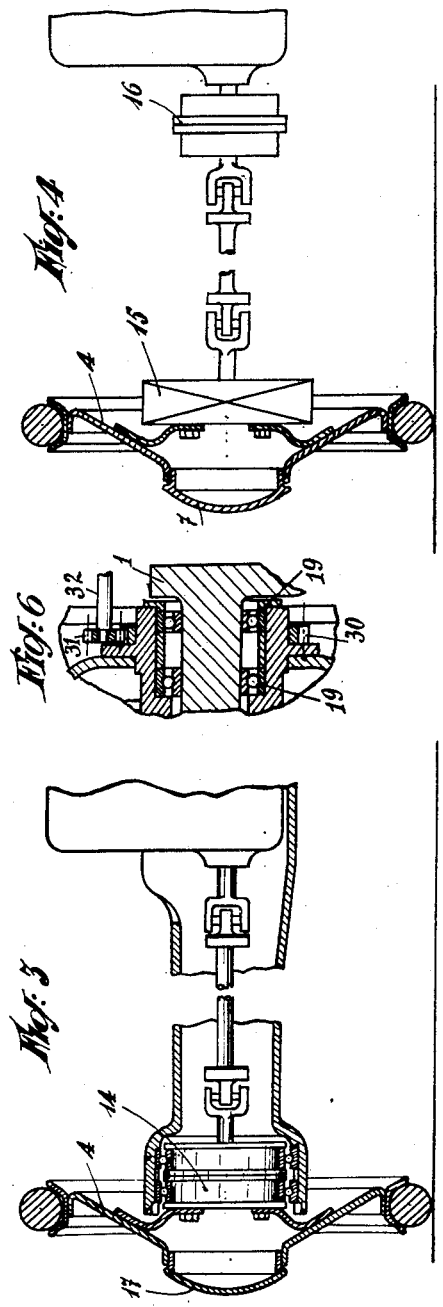

April 28, 1936.  E. BUGATTI  2,039,210
AXLE FOR VEHICLES
Filed May 28, 1935  2 Sheets-Sheet 2

Inventor:—
Ettore Bugatti
By Mauro + Lewis
Attorneys

Patented Apr. 28, 1936

2,039,210

UNITED STATES PATENT OFFICE 2,039,210

AXLE FOR VEHICLES

Ettore Bugatti, Molsheim, France

Application May 28, 1935, Serial No. 23,913
In France May 31, 1934

11 Claims. (Cl. 180—62)

The present invention relates to systems for use in connection with vehicles of any kind whatever which include an axle at least a portion of which forms a kind of trough or casing adapted to receive an engine. This system, which will be hereinafter called "casing-axle", can be used in connection with vehicles of all kinds, adapted to run on roads, special runways, or rails.

The essential feature of the casing-axle according to the present invention is the following: The axle is connected to the engine that it supports through elastic suspension means and, between the engine and the driven members carried by said axle, there are provided universal joints or elastic joints. With this arrangement, the relative displacements of the engine and of the axle can take place without the drive of the driving wheels being perturbed in any way. Owing to the elastic suspension, the engine has much less to suffer from the vibrations produced by the road or the runway than in systems in which the suspension is rigid. As a matter of fact, for practical purposes, the engine does not suffer from these vibrations.

In a preferred embodiment of the present invention, the crankshaft acts directly at both ends on the transmissions connected with the driving wheels of the vehicle and each of which has to support only one half of the driving effort. In each of these transmissions it is advantageous to interpose a gear box and a clutch. The gear box may be a planetary box located either close to the engine or close to the wheel. It may even constitute a part of the wheel itself and in this case it may be accessible from the outside, after removal of a cover. The clutch may be of a mechanical type. But, preferably, it consists of a hydraulic clutch the advantages of which are especially interesting in the present case. This clutch also may be disposed as above stated concerning the gear box. Instead of a hydraulic clutch I may make use of a device for limiting the torque, but in both cases a differential gear can be dispensed with.

In an embodiment of the invention, the trough into which the engine is engaged acts as an oil sump for said engine.

Advantageously, the engine is of the type in which the crankshaft is carried by the cylinder-block itself. This engine, which may be of any type whatever, for instance of the piston type or of the rotary type, may be replaced by an electrical or fluid receiver to which motive energy is fed in any suitable manner.

In some cases, and especially when the vehicle to be fitted with the casing-axle according to the present invention is a railroad vehicle, that is to say a vehicle the width of which is limited by the dimensions of the track-gauge, there may exist difficulties for housing an engine which must be powerful and therefore occupies a considerable volume. Furthermore, it may be advantageous for other reasons to locate the wheels on the inner side of the points at which the load of the vehicle frame is transmitted to the axle.

A further object of this invention is to provide an improved casing-axle which obviates the difficulties above mentioned. However, it should be well understood that this embodiment of the invention, although especially interesting in the case of railroad vehicles, is not limited, in its application, to its use in connection with such vehicles.

In the casing-axle according to this embodiment of the invention, the wheels are mounted on sleeves or sockets which may constitute tubular hubs and which are journalled on the ends of the axle. The essential feature of this embodiment lies in the fact that the springs or other devices for suspension of the frame rest upon this sleeve or socket, preferably on the outside of the wheels. With such an arrangement, the whole of the space between the internal faces of the wheels is available for placing, in the casing, a relatively long engine and its accessories. The sleeve or socket that corresponds to each wheel being relatively long, the portion of the casing-axle that is surrounded by said sleeve and which forms a passage for the driving transmission is generally long enough for wholly, or nearly wholly, protecting the universal joints. If there exists a clutch or a gear box associated with the wheel, it may be mounted at the outer end of the sleeve, and even on the inside of the sleeves if the dimensions thereof are sufficiently large, so that the space between the internal faces of two corresponding wheels, respectively, is entirely free.

In actual practice, the strap of the suspension spring or an analogous member is connected to a collar which surrounds the sleeve or socket of the wheel and it is separated therefrom by a bearing such as a ball bearing or a roller bearing.

Alternatively, instead of being driven as above described, the wheel may be driven through a toothed crown wheel provided on its hub on the side of the engine. In this case, the wheel may be so shaped as to present, in its central portion, an outward projection in which this crown wheel is housed in such manner that the engine may extend close to the wheel without impairing the possibility of providing a transmission which is deformable as it may be desired.

Other features of the present invention will result from the following detailed description of some embodiments thereof.

Preferred embodiments of the present invention will be hereinafter described with reference to the accompanying drawings, given merely by way of example, and in which:

Fig. 1 is a diagrammatic longitudinal sectional view of a casing-axle made according to the present invention;

Fig. 2 is a sectional view on the line 2—2 of Fig. 1;

Figure 5:
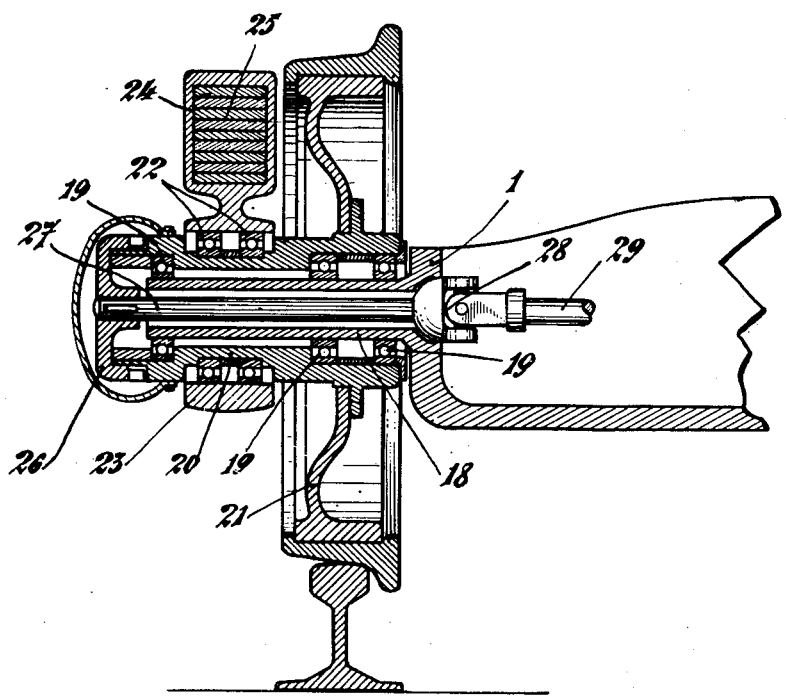

Figs. 3 and 4 relate to modifications, each of these two last mentioned views representing one half of the casing-axle with the corresponding transmission;

Fig. 5 is an axial sectional view showing one vehicle wheel and the portion of the casing-axle adjacent to said wheel, according to still another embodiment of the invention.

Fig. 6 is a detail view showing a modification of the driving means.

As shown by Figs. 1 and 2, the central portion of the axle is of U-shaped cross section, forming a kind of casing 1. This casing is adapted to receive the engine 2 and it may, if desired, act as an oil sump for said engine. In the example shown in the drawings, the engine rests on the edges of casing 1 through springs 3. Of course it might rest upon elastic cushions supported by casing 1, or upon pneumatic cushions, upon coil springs, etc., employed either separately or in combination.

The respective ends of the axle carry the wheels 4 and 5, which may be provided with pneumatic tires or not. These wheels are driven by engine 2 through transmissions which include universal joints or elastic couplings 6, 7 and axles 8, 9 of non-circular section. Furthermore, in the example shown by these views, the transmissions further include clutches 10, 11, diagrammatically shown in the drawings, and two gear boxes similar to each other and shown at 12 and 13.

In the embodiment of Fig. 3, wheel 4 is fixed directly by means of bolts to one of the parts of a hydraulic clutch 14 disposed at the end of the casing-axle.

In the embodiment of Fig. 4, the wheel 4 is adapted to be driven through a planetary gear box, shown at 15. The hydraulic clutch, which is assumed to be still employed, is located close to the engine at 16. In this embodiment of the invention, the gear boxes corresponding to both wheels respectively are preferably provided with a common control device. The whole may be so devised that, after removing cap 17, the transmission shaft through which the crankshaft of the engine is connected with the wheel of the vehicle can be removed from the outside.

It should be well understood that the casing-axles shown in the drawings are essentially diagrammatic, a certain number of the parts thereof having been shown in a conventional manner. Of course the details of the construction can be modified and devised in any suitable manner without departing from the principle of the present invention.

In the embodiment of Fig. 5 the casing axle is shown in connection with a railroad vehicle because it is particularly advantageous in this case, but the arrangement shown in this figure could be used in connection with vehicles of a different kind.

The casing axle 1 is provided, at either end, with a tubular portion 18 which supports, through ball bearings 19, a sleeve 20. On this sleeve is fixed, through bolts or in any other manner, the web 21 of the wheel. On the outer side of wheel 21, sleeve 20 carries, through ball bearings 22, a collar 23, which is shown to be integral with the strap 24 of suspension spring 25.

The engine (not shown in this figure) is housed, as above stated, in the casing constituted by the central portion of casing axle 1. It drives wheel 21 through sleeve 20, disc 26 provided with projections extending parallelly to the axis of the wheel from the periphery of said plate, shaft 27, universal joint 28 and shaft 29. Shaft 29 is connected with the main shaft of the engine through another universal joint (not visible in the drawing). Disc 26 can slide axially, but cannot rotate, with respect to shaft 27 in such manner that the projections it carries can mesh with teeth provided on sleeve 20. A suitable mechanism (not shown in the drawing) makes it possible to displace this plate 26 on shaft 27 so as to permit of bringing into action or out of action the clutch thus made.

If it is desired to provide the largest possible room for locating the engine and its associated parts, I may place one of the universal joints as shown at 28 on Fig. 5 or even farther from the engine so that it projects into or is located within tube 18, and dispose the other universal joint (which in the above description has been assumed to be located close to the engine) in the vicinity of the clutch 20—26 or even combine said universal joint with toothed disc 26. In this case, the transmission is protected wholly or substantially wholly inside tube 18 and the side portion of the engine can therefore extend very close to the wheel.

Since, in the case of a railroad vehicle, the distance between the internal faces of the wheels mounted on the axle corresponds to a length necessarily limited to a relatively small value, it is clear that the arrangement just above described permits the best possible utilization of this distance for disposing the engine in the casing-axle.

Of course the invention is not limited to the specific arrangement above described with reference to the drawings. Furthermore, the clutch, which is disclosed in a very diagrammatic manner on the drawings, may be made of any suitable type. For instance it may advantageously be a hydraulic clutch. In a likewise manner, the two universal joints may be, in a known manner, grouped together so as to occupy very little space. Of course, the transmission shafts are provided, where this is necessary, with sliding portions in order that the vertical displacements of the engine with respect to the casing may take place without exerting any detrimental action on the transmission. Finally, it will be readily understood that sleeve 20 might if desired be provided with a toothed crown wheel 30, meshing with a pinion 31 which is driven by a shaft 32 connected with the engine (Fig. 6).

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a vehicle mounted on wheels, the combination of an axle for two of said wheels at least a portion of which is so shaped as to constitute a casing, an engine elastically supported in said casing, transmission means between said engine and said wheels, and universal joints interposed in said transmission means, whereby the vibrations produced by the movement of the vehicle have little or no effect on the engine and the displacements of the latter with respect to the axle can take place without detrimental action on the transmission.

2. In a vehicle mounted on wheels, the combination of an axle for two of said wheels at least a portion of which is so shaped as to constitute a casing, an engine elastically supported in said casing, transmission means between said engine and each of said wheels, universal joints interposed in said transmission means, whereby the vibrations produced by the movement of the vehicle and the displacements of the engine with respect to the axle can have no detrimental action on the engine and the transmission means, and at least one clutch and one gear box interposed in each of said transmission means.

3. A system according to claim 2 in which the clutches are of the hydraulic type.

4. A system according to claim 2 in which said gear boxes are planetary gear boxes.

5. A system according to claim 2 in which the clutches are located adjacent the wheels respectively.

6. A system according to claim 2 in which the gear boxes are located adjacent to the wheels, respectively.

7. A system according to claim 1 in which the portion of the axle that constitutes a casing in which the engine is supported forms an oil sump.

8. In a vehicle mounted on wheels, the combination of an axle for two of said wheels at least a portion of which is so shaped as to constitute a casing, an engine elastically supported in said casing, a sleeve rigid with each of said wheels journalled at each end of said axle, transmission means, including universal joints, for connecting said sleeves with the engine shaft, and means for transmitting the load of the vehicle to said sleeves.

9. In a vehicle mounted on wheels, the combination of an axle for two of said wheels at least a portion of which is so shaped as to constitute a casing, an engine elastically supported in said casing, a sleeve rigid with each of said wheels journalled at each end of said axle, respectively, transmission means, including universal joints, for connecting said sleeves with the engine shaft, and means for transmitting the load of the vehicle to said sleeves at points thereof located on the outer sides of the wheels, respectively.

10. A system according to claim 8 in which the last mentioned means include suspension springs, and means including at least one bearing interposed between said springs and said sleeves respectively.

11. A system according to claim 9 in which the last mentioned means include suspension springs, and means, including at least one ball bearing, interposed between said springs and said sleeves, respectively.

ETTORE BUGATTI.